SELF-SYNCHRONIZING DELAY LINE DATA TRANSLATION

Filed Sept. 29, 1959 2 Sheets-Sheet 1

PRIOR ART

INVENTORS: W. E. BAKER
F. E. FROEHLICH

BY J. P. Kearns, Jr.

ATTORNEY

SELF-SYNCHRONIZING DELAY LINE DATA TRANSLATION

Filed Sept. 29, 1959 2 Sheets-Sheet 2

INVENTORS: W. E. BAKER
F. E. FROEHLICH
BY J. P. Kearns, Jr.
ATTORNEY

United States Patent Office 3,107,344
Patented Oct. 15, 1963

3,107,344
SELF-SYNCHRONIZING DELAY LINE DATA TRANSLATION

William E. Baker, Summit, and Fritz E. Froehlich, Morristown, N.J., assignors to Bell Telephone Laboratories, Incorporated, New York, N.Y., a corporation of New York Filed Sept. 29, 1959, Ser. No. 843,187
7 Claims. (Cl. 340—173)

This invention relates generally to the storage of electrical signals in digital form and more particularly to the storage of such signals in circulating memory systems employing acoustic delay lines.

For purposes of illustration the invention is described below as embodied in a self-synchronizing circulating memory system employing a magnetostrictive delay line.

In the handling of digital information in data transmission systems and computing apparatus, memory systems are important components. Both static and dynamic memories have been developed using a variety of physical principles and properties of materials. Static memories are represented by magnetic cores in which information is stored in the form of a remanent flux state and cathode-ray tubes in which information is stored as a pattern of electric charges. Dynamic memories are realized in rotating magnetic drums and mercury acoustic delay lines. The latter are generally of the cyclic or circulating type in which binary data bits are impressed on the memory device at one end, circulated through the device for a particular transit time, picked off at the end of the device, and recirculated through the device.

Static memories generally have only limited storage capacity for a given quantity of storage and access equipment and access time may be high. Dynamic memories, on the other hand, are more easily adapted to the storage of large quantities of digital data in a compact apparatus and at the same time the amount of access equipment is greatly reduced by reason of the fact that all the stored information is continually moving before the write-in and read-out apparatus. However, with the cyclic memories of the prior art, provision must be made to index the circulating information by means of some external synchronizing clock. On a rotating magnetic drum, for example, a separate track on the surface thereof is usually reserved solely for the purpose of generating timing or clock pulses. On the mercury delay line, timing may be secured from a separate set of input and output crystals located in the same body of mercury as the information circuit crystals. In each of these cases the stored data and the timing pulses are maintained in careful isolation from one another in the storage medium.

Recently, acoustic delay lines employing the principle of magnetostriction have been developed. These have been incorporated in circulating memory systems by providing input and output transducers coupled together through a regeneration circuit. An important advantage of the magnetostrictive delay line over the mercury delay line in circulating systems is that input signals may be applied at baseband without modulation on an ultrasonic carrier wave. Also, a plurality of output transducers may be coupled to a single delay line to obtain a plurality of outputs as in a serial to parallel converter, for example. The latter fact is availed of in the present invention to make possible the self-synchronization of an acoustic delay line storage device from the structure of the stored message itself.

Accordingly, it is an object of this invention to permit a block of digital information stored in a circulating acoustic delay line to be self-synchronizing with respect to the beginning and end of the stored block.

It is a further object of this invention to permit a block of information stored in a circulating acoustic delay line to be self-synchronizing with respect to individual data pulses.

In accordance with an embodiment of the invention, an elongated nickel wire having magnetostrictive properties has a first inductive transducer means associated with it at one end for the introduction of acoustic waves therein. A second inductive transducer means is positioned a predetermined distance away from the first transducer means for detecting delayed acoustic waves in the nickel wire and for transforming them into electrical signals. Regenerating and timing means interconnect the first and second transducer means to establish a recirculation of acoustic signals along the nickel wire and to provide access to the stored signals. Additional transducer means are positioned along an extension of the nickel wire adjacent to said second transducer means and spaced therefrom and from each other at successive distances which produce a delay interval equal to one pulse interval between successive pulses of the circulating signal. The electrical outputs of the additional transducer means are used as timing signals not only to control the regeneration and timing means but also to control access to the stored signals.

In order to facilitate access to the stored signals a particular message structure which comprises marker bits positioned between message bits is employed to enable the access circuits to detect the beginning and end of a stored block of information even though the length of the block may be constantly changing.

A cyclic storage system according to this invention has particular utility in a buffer memory of the type disclosed in the copending application of F. E. Froehlich, Serial No. 818,868, filed June 8, 1959.

A feature of this invention is that the self-synchronized delay line may store a block of digital data signals of constantly varying length with a minimum of equipment.

Another feature is that self-synchronization renders the delay line largely independent of temperature fluctuations and tension changes.

Further features, advantages and objects may be appreciated from the following detailed description when read in conjunction with the drawing, in which.

Figure 1:
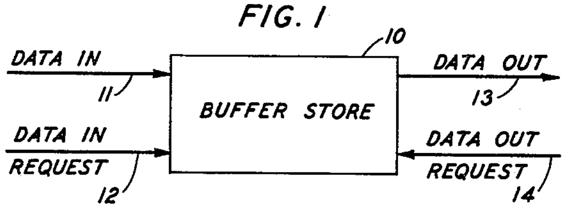
FIG. 1 is a block diagram of a generalized prior art buffer storage system.

The general case of a digital memory device or buffer store is illustrated in FIG. 1. Data bits are fed into the block 10 from data on lead 11 whenever a data-in request pulse is received on lead 12. Buffer store 10 is assumed to have some finite storage capacity so that a certain total number of input signal bits can be absorbed without causing the buffer 10 to overflow. A stored data bit can be removed on data-out lead 13 at any time a request pulse is received on data-out request lead 14. If it is assumed that data bits are being fed into the store 10 at a fluctuating rate, the presence of the buffer store makes it possible to remove bits at a fixed bit rate which may be higher than the highest input bit rate, provided only that the output bits be removed in blocks of a chosen length which will not permit the buffer to be completely emptied. This general buffer storage system, which is disclosed in more detail in the aforementioned copending application of F. E. Froehlich, is shown here by way of introduction to establish utility for the present invention in a system for matching different data bit rates.

Figure 2:
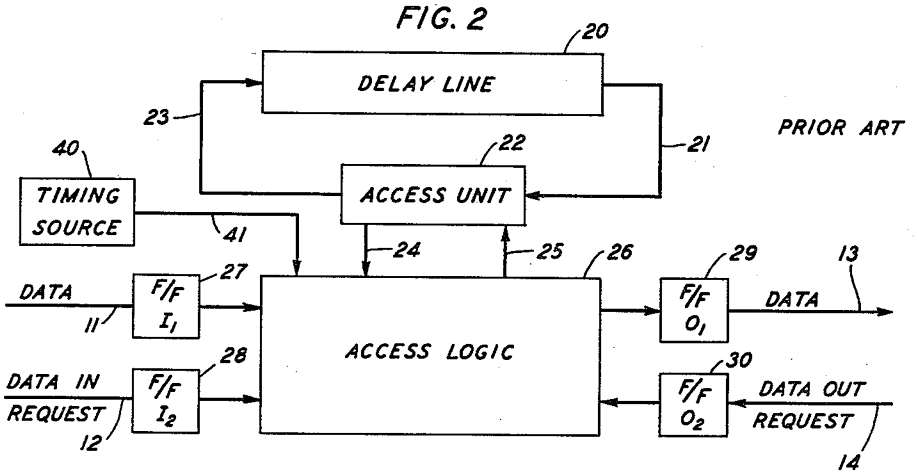
FIG. 2 is a block diagram of a prior art buffer storage system including means for obtaining access thereto for inserting and removing data signals.

Referring now to FIG. 2, there is shown in more detail the known buffer store 10 of FIG. 1 as comprising a looped delay line 20, an access unit 22, access logic circuits 26 and input and output flip-flops 27 through 30. Delay line 20 comprises a magnetostrictive delay line such as is illustrated in FIG. 12 on page 930 of the Bell System Technical Journal, volume XXXVIII, Number 4. This delay line, which is referred to merely by way of example, comprises a pair of cylindrical carriage rods held in parallel relation by separation members affixed to the ends thereof; a fine nickel wire, the magnetostrictive material, stretched between the separation members midway between and parallel to the carriage rods; and input and output transducer means supported by the carriage rods and having coils of fine wire encircling the nickel wire. The usual magnetic biasing means is included in the output transducer.

Electrical signals of the binary type are coupled to the nickel wire by means of the fine wire coils at the input transducer. These signals cause a build-up and decay of magnetic flux in the portion of the wire encircled by the transducer coil which, in turn, causes a longitudinal contraction in the physical dimension of the nickel wire in accordance with the Joule magnetostrictive effect. The contraction of the nickel wire is propagated therealong at the velocity of sound in nickel which is about 4900 meters per second or 5.27 microseconds per inch.

When the elastic disturbance in the nickel wire due to the contraction at the input transducer reaches the point at which the output transducer is located, a change of magnetic reluctance in the nickel wire in accordance with the well known Villari effect induces a voltage pulse in the coil of the output transducer which also includes a permanent magnet biasing means as in the usual practice. Inasmuch as the elastic disturbance induced in the nickel wire is propagated in both directions from the input transducer, it is usual to apply some absorbent material such as beeswax at the ends of the wire to limit undesired reflections or echoes. The overall result is that an electrical signal pulse impressed on the input transducer is propagated down the nickel wire as an acoustical disturbance and gives rise to an electrical impulse at the output transducer at a later time determined by the spacing between the transducers. Recirculation of the pulses is obtained by continuous regeneration and reshaping of the output pulse and application to the input transducer.

Access unit 22 constitutes temporary storage means by means of which bits of data can be inserted or removed from a circulating block of data. It is essentially a shift register and may be of any well known form. As will become apparent in the description below, the information shifting through access unit 22 makes it possible for the access logic 26 to locate the beginning and end of a circulating block of information which may vary in length. Access unit 22 is coupled to the input of delay line 20 by lead 23 and to the output of the delay line by lead 21. Leads 24 and 25 provide a connection from access logic 26 to the beginning or end of a circulating message block.

In operation of the system of FIG. 2, a block of data in storage is continually recirculated through the delay line and the several stages of access unit 22. The rate of recirculation is made faster than the shortest interval between successive requests for inserting information into the buffer and successive requests for removal of information. Only one bit of information generally is inserted or removed on any given circulation cycle in the illustrative embodiments. More bits can be handled simultaneously with appropriate logic circuitry. Effectively then, information stored in the delay line has been compressed on the time scale and becomes available for processing at least once between successive input or output operations. In order to control the circulation rate through the system a timing source 40 connected into the logic circuit 26 by way of lead 41 is required to keep the circulating bits from running together due to temperature effects and the like. Use of the timing source also facilitates location of particular bits of data with respect to the beginning and end of a circulating block.

The operation is substantially as follows. To insert a data bit into the delay line, a bit arriving on line 11 is momentarily stored in flip-flop $I_1$, designated by numeral 27. Simultaneously, a synchronization pulse supplied by the input equipment arrives on line 12 and sets flip-flop $I_2$ designated by numeral 28 and informs access logic 26 that a data bit has been stored for transfer into the delay line. With the aid of the timing source 40, the access logic subsequently recognizes the end of the stored block of data as it passes through access unit 22, inserts the incoming data bit at the end of the message blocks, and resets flip-flops $I_1$ and $I_2$ in any well known manner. For simplicity all inputs and outputs to the flip-flops are not shown in FIG. 2.

Access logic 26 is so arranged as to store the first bit from a circulating block of data in flip-flop $O_1$ designated by numeral 29. A request for output data on line 14 which sets flip-flop $O_2$ designated by numeral 30 causes access logic 26 to reset flip-flop $O_1$, thereby releasing the bit stored there to output line 13. Access logic 26 then recognizes the beginning of the circulating block of information and replaces the next stored data bit in flip-flop $O_1$ and resets flip-flop $O_2$.

The magnetostrictive delay line is particularly attractive in the storage system of FIG. 2 in that it affords a relatively large storage capacity in a small compact space on an economical storage medium. The delay line need not, however, be constructed in straight-line form as previously mentioned. For example, the nickel wire, instead of being stretched out in one straight line, may be helically coiled into a small space with the same electrical results. If, for example, a 300-microsecond delay time is chosen requiring a straight-line delay line about five feet in length, a maximum input or output bit rate exceeding 3000 bits per second can be achieved. Allowing a one microsecond spacing between pulses, the delay line capacity becomes 300 bits and in helical form may be compressed into a space of 15 to 20 cubic inches.

Since the amount of data stored in the delay line may vary between zero bits and full capacity, it is necessary to be able to locate both the beginning and end of the stored block of data. Magnetostrictive delay lines perform best when operated in a strictly binary manner. The beginning and end of the stored block can be located, for example, by reserving a special code for the purpose. This, of course, places restrictions on the message. Where restrictions on the message are undesirable, a separate matched delay line may be used as a timing source to monitor the extremities of the stored block of information.

It is possible, however, to make the message self-indexing by encoding the entire message on the delay line and the use of a magnetostrictive delay line makes this possible in a simple manner without placing any restrictions on the message itself and without an auxiliary delay line.

Figure 3:
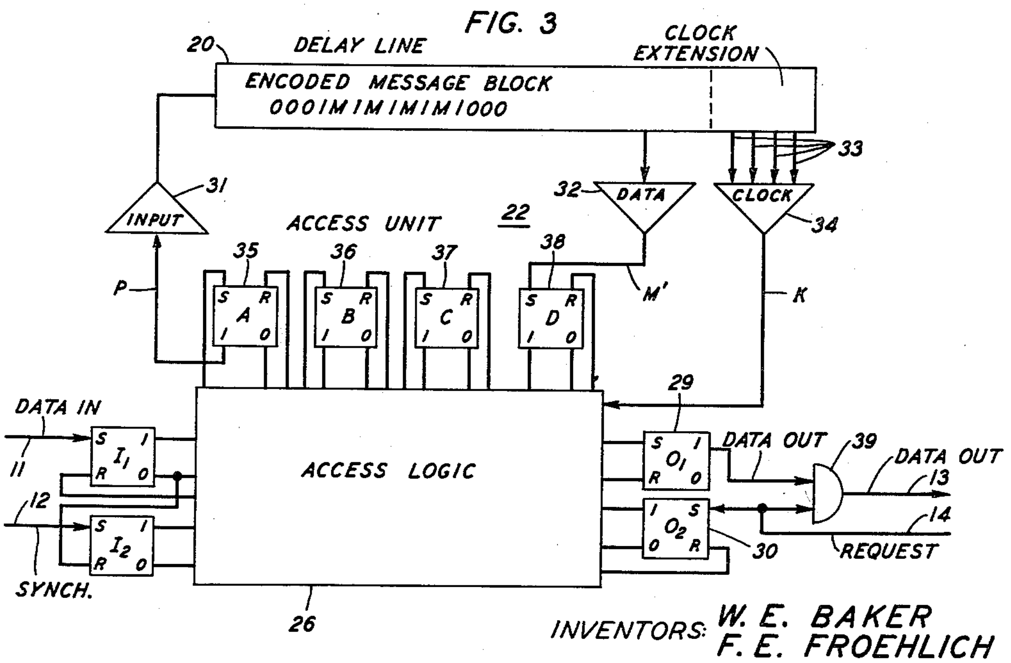
FIG. 3 is a block diagram of a self-synchronizing buffer storage system according to this invention.

In FIG. 3 there is indicated within the delay line 20 the form of a possible encoded message block. Fiducial marks in the form of binary "one's" (1) are alternated with each message bit (M), which may be either a binary "one" or "zero." In addition, the data block begins and ends with a fiducial "one" marker bit. Outside the data block are binary zeros only. Thus, a valid message block has the form 001M1M1M100. The access logic can then be constructed to recognize from the location of the first and last marker bits both the beginning and end of the data block when these extremities pass through the access unit and to act on the data block accordingly.

The access unit of FIG. 2 may be constructed of four flip-flops A, B, C and D as indicated in FIG. 3 by numerals 35, 36, 37 and 38, respectively. In order to insert a bit of information into the delay line the access logic waits until the access unit is in the state

A B C D
0 0 1 M and then inserts the message bit stored in flip-flop $I_1$ into flip-flop B while flip-flop A is changed to a marker "one." In a similar manner a message bit is removed from the delay line by having the access logic await the pattern

A B C D
M 1 0 0

The message bit is transferred from flip-flop A to output flip-flop $O_1$, and flip-flops A and B are reset to zero. Codes of lower redundancy are obviously possible. Examples are 001MM1MM1MM100 and

001MMM1MMM1MMM100

More complex access logic is required, however, to handle these codes. Whichever code is used, message bits entering the delay line are invariably inserted at the beginning of the message block and message bits leaving the delay line are removed from the end of the block on a first-in, first-out basis.

Clock or timing pulses are required to shift the message and marker bits through the access unit and also to space new information on the delay line in a proper non-interfering manner. The magnetostrictive delay line icludes a feature which according to the present invention simplifies the clocking problem. Additional output transducers are coupled to an extension of the nickel wire beyond the output transducer used to remove message bits from the line. In FIG. 3 it is assumed that four additional transducers are added to the delay line for clocking purposes, each spaced one additional bit interval away from the data output transducer. The four leads 33 are connected to these additional transducers.

FIG. 3 is an elaboration of FIG. 2 and shows certain additional details of a self-synchronizing magnetostrictive delay line storage system according to the present invention. The delay line 20 includes an input transducer toward the left-hand end coupled to regenerating amplifier 31, an output transducer toward the right-hand end coupled to output data amplifier 32 for handling the recirculating message bits, and at the extreme right-hand end and adjacent to the data output transducer four additional output transducers which are coupled by way of leads 33 to clock pulse amplifier 34. Four flip-flops are the correct number for use with the 50 percent redundant message code mentioned above. Additional flip-flops would be required for a less redundant coding. Access unit 22 is shown for present purposes to comprise four flip-flops of conventional design designated by numerals 35 through 38 and arranged in shift register fashion. The output of data amplifier 32 is connected to the set input "S" of flip-flop D by way of lead M'. The "one" output of each flip-flop effectively connects to the set input of successive flip-flops, as D to C, C to B, and B to A through the medium of the access logic by which the setting and resetting of the flip-flops are controlled. The "one" output of flip-flop A connects to amplifier 31 by way of lead P. The remaining inputs and outputs of each flip-flop are connected to the access logic 26. The output of clock amplifier 34 is connected to access logic 26 by way of lead K as shown. The input and output flip-flops for acces logic 26 are the same as the correspondingly numbered elements in FIG. 2. In addition, AND-circuit 39 is shown coupled to the output of flip-flop $O_1$, and to data-out line 13 so that a data bit can be removed from flip-flop $O_1$ only when a data request bit is received by flip-flop $O_2$. A further input to AND-circuit 39 is therefore shown from request lead 14 in order to enable AND-circuit 39 when the removal of a data pulse is requested.

The message encoding with marker "one's" inserted between each message bit as described above provides control of the clocking circuit because each message and marker bit also traverses each equally spaced clock output transducer. No clock pulses occur until the circulating message block reaches the clock extension transducers. At the time the first marker bit arrives at the clock extension clock pulses are generated and continue to be generated until four bit intervals after the last marker bit arrives at the output data transducer. Each clock bit through access logic 26 causes the bit temporarily stored in flip-flops D through A to be shifted to the next adjacent flip-flop and finally into the delay line again. The four additional clock pulses insure that the last marker bit is shifted back into the delay line at the end of the message block. The common clock limiting amplifier 34 combines the clock pulses into overlapping relationship during the passage of the body of the message block and also insures that the four additional clock pulses occur in order at the end of the message block. The timing of the clock pulses is controlled by the spacing of the clock extension transducers and therefore the line is self-synchronizing for each message block, thereby preventing any cumulative timing error which otherwise might result in the overlapping or obscuring of message bits. This clocking is purely internal to the delay line circulation circuit and has no reference to the input and output timing of the read-in and read-out circuits employed. As long as the read-in and read-out clocking is slower than the recirculation time of a message block, the overall storage system operates without interference.

Figure 4:
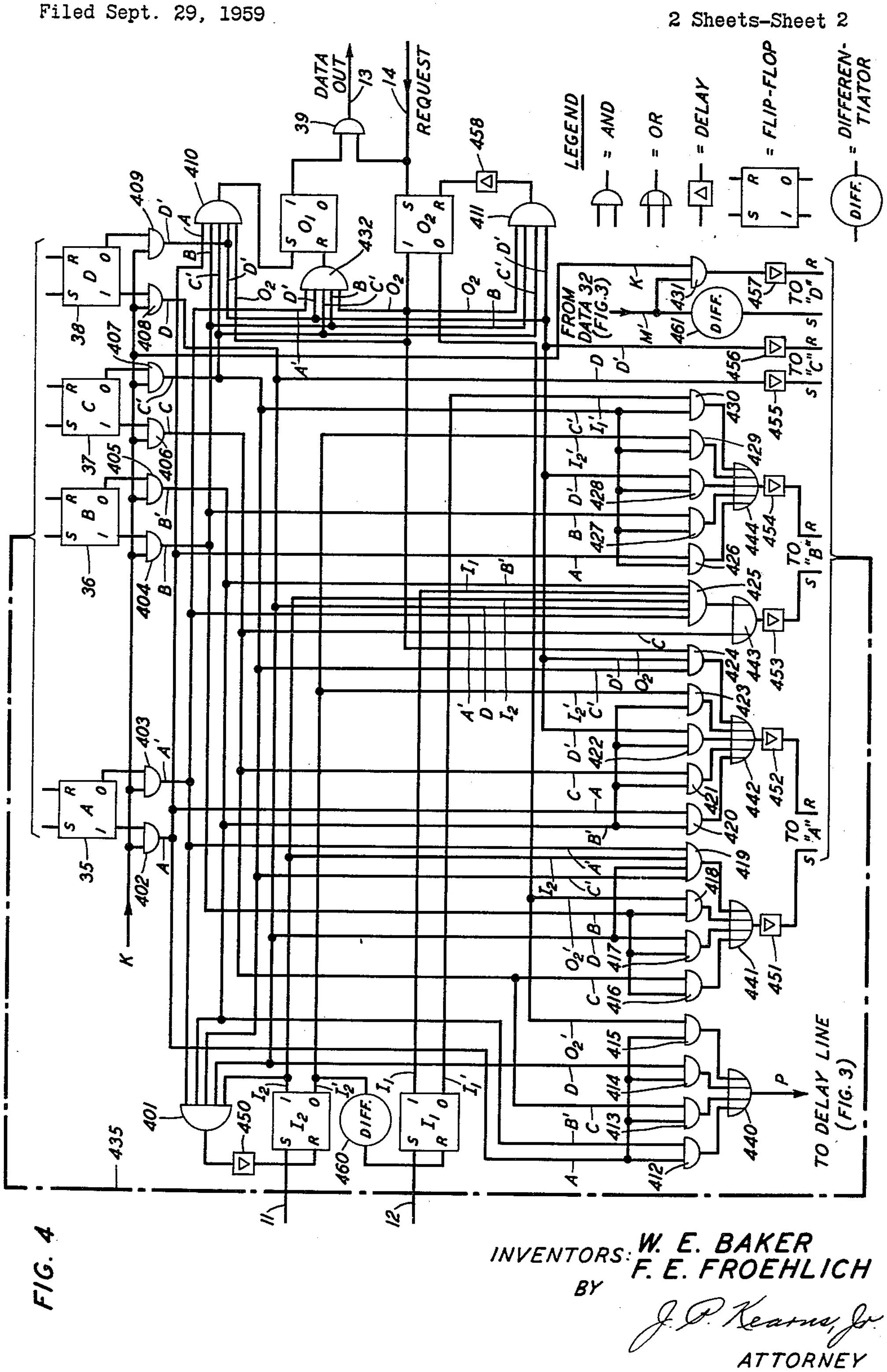
FIG. 4 is a schematic diagram of an access logic circuitry useful in the practice of this invention.

FIG. 4 is illustrative of an access logic circuit that can be employed in the practice of this invention. FIG. 4 substantially supplies the circuitry for block 26 in FIG. 3, but for clarity and completeness repeats certain connecting elements such as the access unit flip-flops 35 through 38 and input and output flip-flops 27 through 30. The blocks in FIG. 4 labeled A, B, C and D represent the access unit shift register flip-flops 35 through 38. It will be observed that the set and reset leads at the bottom of the drawing are brought to the set and reset imputs of blocks A through D at the top of the drawing by way of a cable 435 in order to minimize lead crossings. The output connections to these flip-flops are shown at the top of the drawing and the input connections are shown at the bottom. The input flip-flops $I_1$ and $I_2$ are the same as those similarly designated in FIG. 3. Also, the output flip-flops designated $O_1$ and $O_2$ correspond to the similarly designated flip-flops 29 and 30 in FIG. 3.

In addition to the elements repeated from FIG. 3, FIG. 4 includes AND-circuits 401 through 432 indicated by open half circles, OR-circuits 440 through 454 indicated by half circles with input leads extending therethrough, delay elements 450 through 457 indicated by square-enclosed triangles, and differentiating circuits 460 and 461 indicated by circles. The legend on FIG. 4 identifies the symbols used in the drawing. Input line K is assumed to extend from the output of clock amplifier 34 in FIG. 3. Input line M' is the line extending from the output of data amplifier 32 (shown in FIG. 3) to flip-flop 38. Data amplifier 32 includes a monopulser (one-shot multivibrator) which makes the output on lead M' an inversion of the data output from delay line 20. Normally a positive potential exists on lead M', but when a pulse occurs the lead is grounded for the few microseconds necessary to set the D flip-flop. Finally the output line P from OR-circuit 440 represents the line shown in FIG. 3 which extends from the "1" output of flip-flop 35 to delay line input amplifier 31.

The circuit of FIG. 4 operates according to well known principles of digital logic. Let us assume that no message bits are circulating in the delay line. Only a single marker bit is then present to maintain the circulation. As the marker bits reaches the end of the delay line a negative-going pulse appears on line M'. Differentiator 461 differentiates this pulse and produces a positive spike coincident with the trailing edge of the bit which is applied to the set input of flip-flop D. All four flip-flops had previously been in their reset states with an effective output on their "0" output leads only. The set pulse applied to flip-flop D causes the latter to change state, thereby transferring the effective output from the "0" to the "1" output lead. One bit interval later a clock pulse derived, according to this invention, from the first of the additional transducers on delay line 10 appears on lead K to operate AND-gates 402 through 409.

It will be noted that the even-numbered AND-gates 402 through 408 are also connected to the "1" outputs of flip-flops A through D, and the odd-numbered AND-gates 403 through 409 are connected to the "0" outputs of flip-flops A through D. The output leads from the even-numbered gates are designated by the same unprimed letter as the corresponding flip-flop. In like manner the output leads from the odd-numbered gates are designated by the same letter primed as the corresponding flip-flop. At any given time a positive output can occur on only one of the primed and unprimed output leads associated with a given flip-flop.

At the occurrence of the first timing pulse only the lead D is activated. Thereupon, flip-flop C is set after a delay interval less than a bit interval determined by delay element 455. AND-gate 431 is also enabled by the timing pulse and the normal positive output on lead M'. However, due to the brief delay in element 457 flip-flop D is not reset until sufficient time has elapsed to allow the setting of flip-flop C.

Flip-flop C set partially enables gate 406 until the second timing pulse occurs. At this time an output on lead C enables OR-gate 443 and after a delay due to element 453 sets flip-flop B.

The arrival of the third timing pulse on lead K enables gate 404 at the "1" lead of flip-flop B and sets flip-flop A through AND-gate 416, OR-gate 441, and delay element 451 over lead B just before flip-flop C is reset through delay element 456 over lead D'.

Finally the occurrence of the fourth timing pulse on lead K enables lead A through gate 402. At the same time flip-flop B is reset through AND-gate 426 enabled on lead C' by the previous resetting of flip-flop C, OR-gate 444 and delay element 454. Flip-flop B, reset in conjunction with the output on lead A, enables AND-gate 412 and through OR-gate 440 returns the marker bit to delay line 10 in FIG. 3. By the means outlined above, the marker bit introduced from the output of the delay line 10 on lead M' is advanced under the control of the timing pulses on lead K through each of flip-flops D through A in turn and returned on lead P to the input of the delay line.

If it is desired to insert a message bit on the line, the message bit to be inserted is first applied to set flip-flop $I_1$ on lead 12 in any convenient manner. Assume for the moment that the message bit is a "1." The resulting "1" output on lead $I_1$ partially enables AND-gate 425 which controls flip-flop B. Simultaneously a synchronizing bit on lead 11 sets flip-flop $I_2$, whose "1" output further enables gate 425 and, in addition, AND-gate 419 leading to flip-flop A. Had the message bit been a "0," flip-flop B would have been held reset by way of gate 430. With flip-flops A and B reset upon the arrival of the first timing bit at flip-flop D, AND-gate 425 is fully enabled and flip-flop B is set, that is, flip-flop B stores the message bit. At this same time flip-flop A is set through AND-gate 419, thereby creating a new marker bit preceding the message bit stored in flip-flop B. The second timing pulse arriving on lead K now causes an output on lead P through gate 413, and flip-flops C and D are reset.

The next timing pulse transfers the message bit in flip-flop A to the lead P and flip-flop B is reset by way of AND-gate 428. Meanwhile, flip-flop A is held set through gate 418. The following timing bit transfers the last marker bit from flip-flop A onto lead P.

Additional message bits are added to the line in a similar manner to the beginning of the message block up to the capacity of the delay line.

The last message bit of a block, the first to be added thereto, is inserted in the output flip-flop $O_1$ on the next recirculation of the message block through the delay line as follows. The arrival of the lead marker bit sets flip-flop D as before. The first timing bit thereafter resets synchronizing flip-flop $I_2$ by way of AND-gate 401 and delay device 450, and in turn input flip-flop is reset through differentiator 460 on lead $I_2'$ in preparation for the insertion of the next message bit. Finally flip-flop C is set on lead D and flip-flop D is set or reset according to whether the message bits is a "1" or a "0."

The next two timing bits advance the marker and message bits to lead P and flip-flop A, repsectively, in a now obvious manner. On the following timing bit, output flip-flop $O_1$ is set or reset by way of gates 410 or 432, respectively, depending on the nature of the message bit. Flip-flops A and B are reset through gates 424 and 428, thus destroying the terminal marker bit. Thus, a message bit is always available for immediate read-out in flip-flop $O_1$ upon the arrival of a request bit on lead 14. The request pulse enables gate 39 as shown to permit an output on lead 13. As soon as the message bit has been readout, flip-flop $O_1$ is reset by way of gate 432 and is prepared to receive the next message bit from the delay line. Sufficient time is always allowed for the insertion of new message bits in flip-flop $I_1$ and the removal of message bits from flip-flop $O_1$ because the circulation rate of the delay line is about three times that of the input or removal rate permissible. As previously mentioned, a less redundant delay line message coding may be used if a more complex access logic is provided.

For further operations of access logic circuitry 26 not described in detail above, those skilled in the art are referred to the following Boolean algebraic equations in which a subscript S indicates the set condition of the given flip-flop and the subscript R indicates the reset condition thereof. Unprimed letters indicate the "1" output of the given flip-flop and primed letters the "0" output. K and M' represent the timing and message or marker bits, respectively.

$$I_{2R}=KA'B'C'DI_2$$
$$P=KAB'+KAC+KAD+KAO_2'$$
$$A_S=KBC+KBD+KBO_2I+KA'C'DI_2$$
$$A_R=KAB'+KB'C+KB'D'+KB'I_2'+KC'D'O_2$$
$$B_S=KC+KA'B'DI_1I_2$$
$$B_R=KAC'+KBC'+KB'D'+KC'I_2'+KC'I_1'$$
$$C_S=KD$$
$$C_R=KD'$$
$$D_S=M'$$
$$D_R=KM'$$
$$O_{1S}=KABC'D'O_2$$
$$O_{1R}=KA'BC'D'O_2$$
$$O_{2R}=KBC'D'O_2$$

While the invention has been described in connection with a specific embodiment, it will be recognized by those skilled in the art that numerous modifications and applications are possible and that the invention is not in any way limited to the specific embodiment disclosed herein.

What is claimed is:

1. A self-synchronizing electroacoustic recirculating memory system comprising an acoustic delay device having an input and an output transducer for respectively impressing and removing electrical impulses in the form of elastic disturbances of the acoustic medium of said device and arranged to deliver to the output, after a predetermined delay interval depending on the distance between said input and output transducer, signals entering the input, a multistage shift register interconnecting said input and output transducers whereby impulses emitted from said output transducer are reintroduced at said input transducer to establish a continuous recirculation of said impulses through said delay device, additional output transducers coupled to said delay device at uniform distances beyond said first-mentioned output transducer, and means under the control of the impulses emitted from said additional transducers for shifting said register in step with the interval between said last-mentioned impulses.

2. In combination with a delay device having a predetermined delay interval and means for maintaining the circulation of impulses impressed on the input of said device in a continuous loop through said device, means for controlling the pulse interval between circulating impulses comprising a plurality of output pickup devices spaced apart on one end of said delay device at uniform distances from each other, said distances corresponding to the pulse interval desired between successive circulating impulses, and means for impressing the outputs of said pickup devices on said maintaining means.

3. In an impulse circulating network employing an electroacoustic delay medium, and having an input and an output, access means joining the output and input to reintroduce through the input pulses emitted from the output to provide recirculation of a predetermined pattern of pulses through the delay medium, a plurality of transducer means coupled to said delay medium uniformly spaced from said output for producing timing pulses from said pattern of pulses, and means coupling said plurality of transducer means to said access means for controlling the speed of operation of said access means in accordance with said timing pulses.

4. A network according to claim 3 in which said access means is a shift register.

5. Data storage apparatus comprising a signal input line, a control input line, a delay device having an input and an output and adapted to deliver at the output after a predetermined time interval impulses impressed on the input, means connecting said output and input for establishing the continuous recirculation of a pattern of data impulses impressed on said input, timing means for controlling the interval between successive impulses circulating within said delay device comprising output couplings to said delay device spaced from the output thereof at intervals corresponding to said desired interpulse interval and means for connecting said output couplings to said establishing means, input signal transfer means interconnecting said input lines and the input of said delay device and responsive to the simultaneous appearance of a signal and a control impulse on said input lines to impress a new impulse on said delay device and to prefix said new signal impulse by a marker impulse, a signal output line, a control output line, and output signal transfer means interconnecting said output lines and the output of said delay device and responsive to a control impulse on said control output line to deliver the last signal impulse in the pattern of impulses circulating in said delay device to said signal output line and to suppress the last marker impulse in said pattern.

6. In combination, an elongated stationary electroacoustic transducer device for delaying at a first location near one end of said transducer by a predetermined time interval impulse signals impressed at a second location near the other end of said transducer and spaced apart from said first location, an output coupling at said first location, an input coupling at said second location, logic circuitry interconnecting said input and output couplings for providing access to said device and for controlling the spacing between individual ones of said signals circulating therethrough, an extension on said device beyond said first location, and means for maintaining the spacing of said signals through said device in consonance with said predetermined delay time interval comprising further output couplings from successive evenly spaced points on said extension to said logic circuitry to furnish timing pulses derived from said circulating signals.

7. In a data translation system including a magnetostrictive delay line having a signal input and a signal output and arranged to deliver through the output after an approximately constant delay interval electrical impulses entering the input, bistable electrical devices connected in tandem and joining the output and the input to reintroduce through the input signal impulses emitted from the output to provide recirculation of a predetermined pattern of signal impulses through the delay line, means for determining the interval between impulses at a relatively constant value comprising a plurality of pickup elements responsive to elastic disturbances in said delay line caused by the impulses impressed thereon and spaced from each other beyond the signal output of said delay line by a distance corresponding to the desired impulse interval, and means for combining the outputs of said pickup elements and applying them to said bistable devices to control the change of state thereof, an input signal transfer link for impressing signals on said delay device and for inserting marker control impulses preceding and following each signal impulse impressed on said delay device so as to form a sequence of signal and marker impulses as said signal pattern, and an output transfer link responsive to a request signal for removing a signal from the output of said delay device and for suppressing the associated marker impulse.

References Cited in the file of this patent

UNITED STATES PATENTS 2,729,811 Gloess ---------------- Jan. 3, 1956

OTHER REFERENCES

Publication: Functional Description of the Edvac, vol. 2, November 1949, FIG. 104–2LD–12 relied on.